A. PFAU.
HYDRAULIC TURBINE.
APPLICATION FILED FEB. 17, 1913.
1,197,761.
Patented Sept. 12, 1916.
2 SHEETS—SHEET 1.
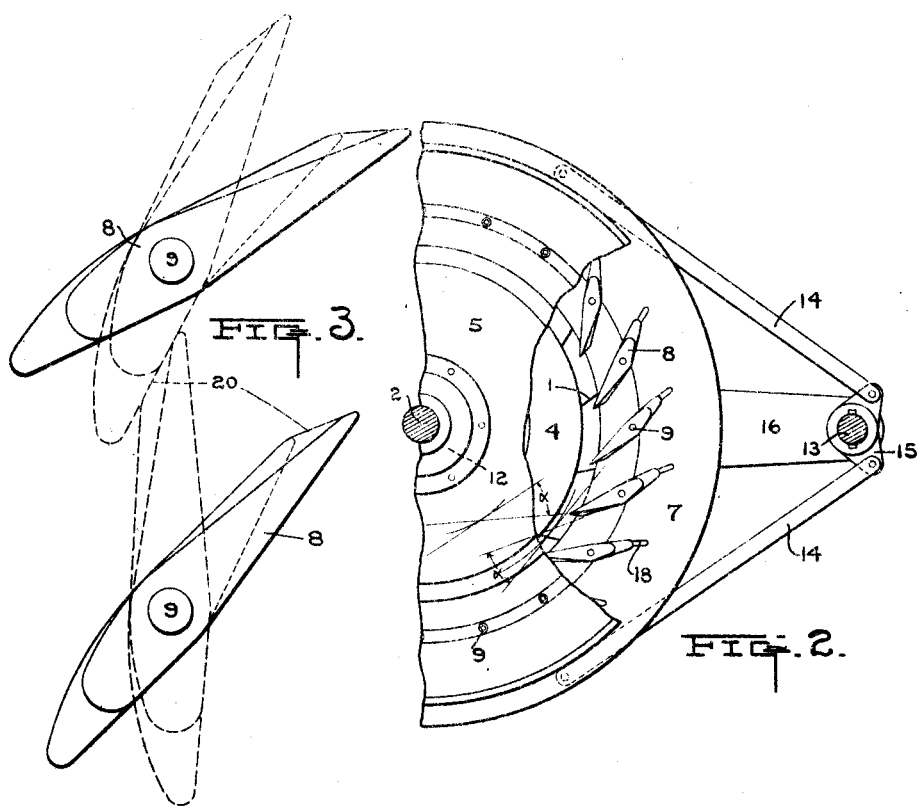
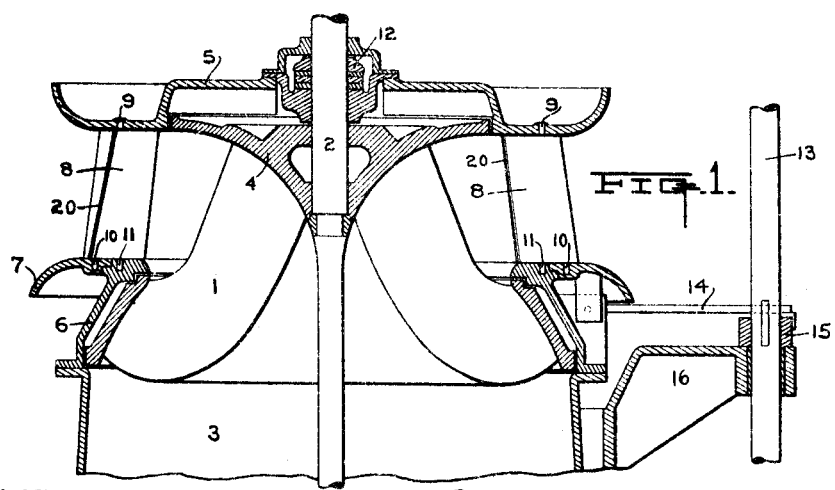
WITNESSES
W. H. Lieber
Rob. E. Stoll
INVENTOR
A. Pfau
BY
ATTORNEY.

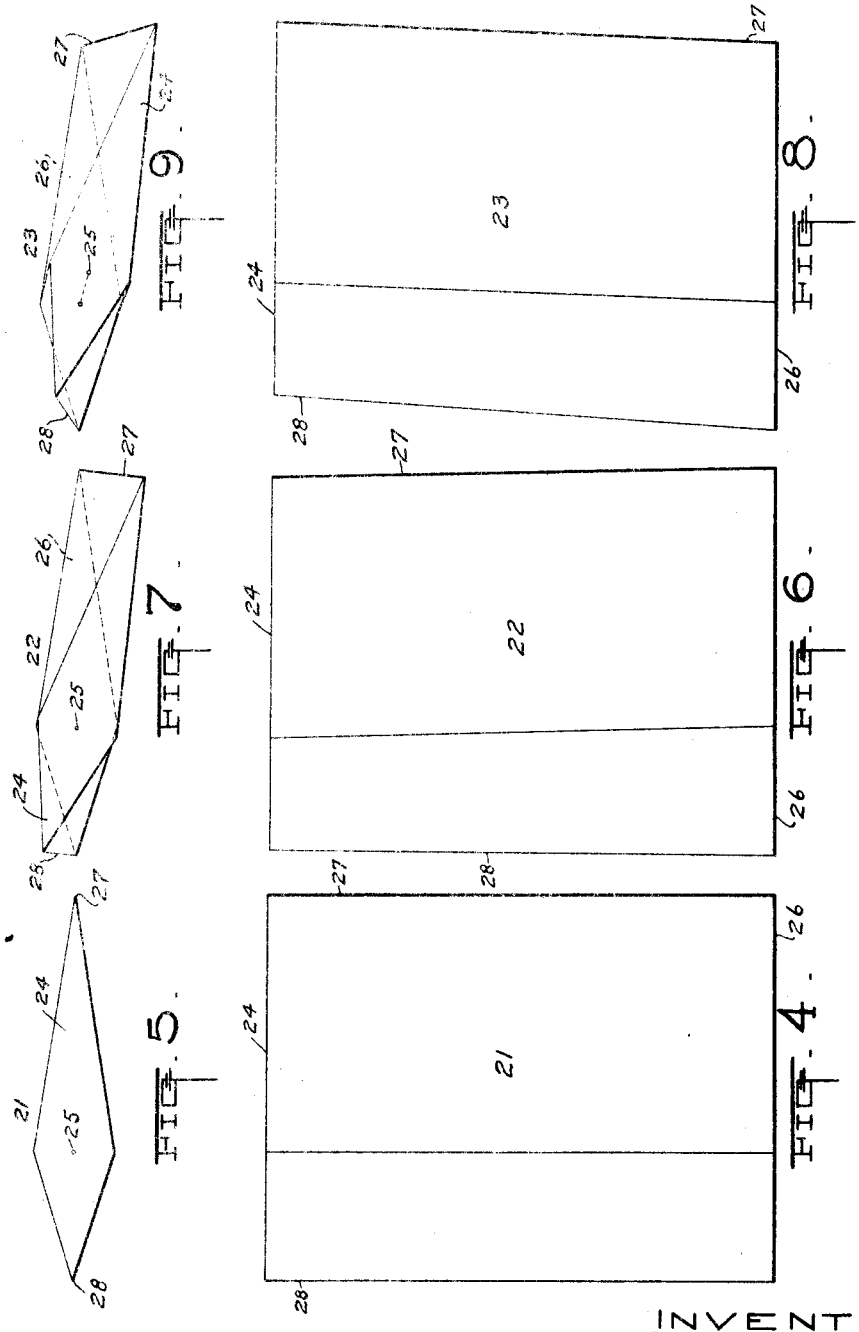

UNITED STATES PATENT OFFICE.

ARNOLD PFAU, OF MILWAUKEE, WISCONSIN, ASSIGNOR, BY MESNE ASSIGNMENTS, TO ALLIS-CHALMERS MANUFACTURING COMPANY, A CORPORATION OF DELAWARE.

HYDRAULIC TURBINE.

1,197,761. Specification of Letters Patent. Patented Sept. 12, 1916.

Application filed February 17, 1913. Serial No. 749,538.

*To all whom it may concern:*

Be it known that I, ARNOLD PFAU, a citizen of the Republic of Switzerland, residing at Milwaukee, in the county of Milwaukee and State of Wisconsin, have invented a certain new and useful Improvement in Hydraulic Turbines, of which the following is a specification.

This invention relates to improvements in the construction of hydraulic turbines, and more particularly to improvements in the construction of guide vanes and runners for turbines of the Francis type.

An object of the invention is to provide a hydraulic turbine which is simple in construction, efficient in operation, and in which the cost per unit of power produced is reduced to a minimum.

In hydro-electric installations operating under low loads, it is desirable to produce the maximum power with a runner of minimum size in order that the power house cost may be reduced to a minimum. It is also desirable to operate the turbines and generators driven thereby at high speed so that the cost of the electrical apparatus may be reduced to a minimum. With the present invention these desirable features are obtained by so constructing the turbine that the maximum amount of motive fluid may be effectively passed through a runner of minimum diameter, thereby producing the maximum power at the desired high speed.

A clear conception of an embodiment of the invention may be had by referring to the drawings accompanying and forming a part of this specification, in which like reference characters designate the same or similar parts in the various views.

Figure 1 is a transverse vertical section through a hydraulic turbine of the Francis type, showing a fragment of the draft tube connected with the discharge end thereof. Fig. 2 is a fragmentary top view of a hydraulic turbine of the Francis type, the upper turbine casing being broken away to expose a portion of the guide vanes and runner thereof. Fig. 3 is an enlarged top view of several of the guide vanes, showing same in both full open and closed positions. Figs. 4 and 5 are side and top elevations respectively, of a prism having the general shape of an ordinary guide vane. Figs. 6 and 7 are side and top elevations of a prism similar to that disclosed in Figs. 4 and 5, the prism having been distorted by twisting. Figs. 8 and 9 are side and top elevations respectively, of a prism similar to that disclosed in Figs. 6 and 7, the prism having been additionally distorted by skewing.

The turbine runner consists of a rotor 4 having secured thereto a circular series of outwardly flaring buckets 1, the upper ends of the leading edges of which are nearer the turbine axis than the lower ends. The rotor 4 is secured to the turbine shaft 2, which is supported by a suitable bearing 12, fixed to the upper casing 5 of the turbine. The lower casing 6 of the turbine is supported above the draft tube 3, which connects with the tail-race in the usual manner. The guide vanes 8 span the inlet opening which has walls perpendicular to the turbine axis and is formed between the upper and lower casings 5, 6. The vanes 8 control the extent of opening and the direction of flow of the inlet to the turbine. The spent motive fluid, upon leaving the turbine runner is discharged axially through the draft tube 3.

The guide vanes 8 are pivoted to the upper casing 5 by means of the pins 9, and to the lower casing 6 by means of pins 11. The pins 9, 11, may either be independent pins or they may be opposite ends of the same pins which pass through the guide vanes 8. The guide vane adjusting ring 7 is mounted upon a bearing formed on the lower casing 6 concentric with the turbine runner. The ring 7 is angularly shiftable about the turbine axis by means of a gate controlling shaft 13 which is connected with the ring 7 through a bell crank 15 and links 14. The shaft 13 is supported in a suitable bearing formed in the bracket 16. The guide vanes 8 are provided with projecting pins 10 at their lower ends which engage the slots 18 formed in the ring 7. As the ring 7 is shifted angularly about the turbine axis, the pins 10 move along the slots 18 and cause the guide vanes 8 to assume different angular positions relative to the turbine runner.

The formation of the individual guide vanes will be readily understood by referring to Figs. 4 to 9 inclusive, which disclose three steps in the development of one of the vanes. Figs. 4 and 5 disclose a prism 21 having the general shape of an ordinary guide vane in which the axis 25 is perpendicular to its upper and lower surfaces 24, 26, and in which the leading and trailing edges 28, 27, respectively, are also perpendicular to the end surfaces and parallel to the axis 25. The axis 25 and edges 28, 27 of the vane 21 are parallel to the turbine axis. In Figs. 6 and 7, the vane 22 has been produced by distorting the vane 21 by relative twisting of the upper and lower portions about the axis 25. The axis 25 of the vane 22 is still perpendicular to the surfaces 24, 26, but the leading and trailing edges 28, 27, have been inclined relatively to the end surfaces and relatively to the turbine axis. The twisting of the vane 22 has produced warped guiding surfaces and has distorted the trailing end of the vane transversely relatively to the fluid passage past the vane. In Figs. 8 and 9, the vane 23 has been produced by relatively shifting the upper and lower portions of the vane 22 in a direction along the adjacent fluid passage and in the direction of flow of the fluid past the vane, causing the axis 25 to assume an inclined position relatively to the end surfaces 24, 26. The vane 23 besides being warped, has been skewed in a direction along the adjacent fluid passage, and is substantially like the vanes 8 except that the latter have been dressed to eliminate abrupt edges and projections which would tend to undesirably distribute the flow of water past the vane.

The upper portion of the guiding surface of each of the vanes 8 is formed tangent to a circle which is considerably smaller than the circle of tangency of the lower portion of the guiding surfaces of the vanes. The proper direction of the respective portions of the guiding surface of each vane 8 is secured by warping the vane guiding surface to correspond with the direction of the inlet edges of the buckets 1. As the diameter of the bucket inlet or leading edges is considerably less at the upper end of the turbine than at the lower end thereof, it should be noted that by warping the guide vane surfaces the inlet angle α of the stream of motive fluid entering between two successive guide vanes 8 is maintained substantially constant relative to the tangents to the inlet edges of the buckets 1 along the entire lengths of these edges.

It has been found in hydraulic turbine construction that it is not desirable to have too great an amount of clearance volume between the guide vanes and the runner. It has also been found desirable to have the runner inlet diameter as large as possible at its lower end in order to obtain a maximum unobstructed inlet area whereby maximum flow of motive fluid through the turbine is permitted. In order to reduce the clearance volume to the desired minimum and still maintain the inlet diameter of the runner as large as possible, the guide vanes 8, besides being warped or distorted transversely to the direction of flow of the fluid, are skewed or given an oblique shape by distortion in a direction along the adjacent fluid passages. The degree of skewing of the guide vanes 8 is determined by the desired amount of clearance volume. It is not desirable to reduce the clearance volume beyond a certain amount, such amount being necessary to insure smooth entry of the motive fluid to the turbine runner for all angular positions of the guide vanes 8. The skewing of the guide vanes 8 in a direction along the adjacent fluid passage besides reducing the clearance volume, permits reduction of the diameter of the casing 5 so that a relatively small inlet flame may be utilized without undesirably restricting the turbine inlet passage.

It should be noted that as a result of the distortion of the vanes 8 in a direction along the adjacent fluid passage and at an angle relative to their axes of swing, the inner edges thereof would not coact properly in closed position without provision for insuring such closing. The warping of the vanes 8 partially insures such contact of the vanes in closed position. In order to absolutely insure perfect contact of adjacent vanes 8 in closed position, the vanes are provided with parallel machined contact surfaces or strips 20 at their trailing edges and sides respectively. The contact strips 20 are formed as planes which are parallel to the axis of rotation of the vanes 8 in order to insure contact along the entire vanes in closed position. It will be noted that due to the warping of the guide surfaces of the vanes, the straight line elements forming the strips 20 are not parallel to the vane axes but slope forward, see Fig. 1.

From this description and disclosure it will be readily seen that by skewing the guide vanes 8 in a direction along the adjacent fluid passages and warping the guiding surface to properly direct the entering motive fluid, the runner may be so designed as to provide an efficient minimum sized runner capable of producing maximum power. The guide vanes 8 are capable of admitting a large amount of motive fluid to the turbine buckets 1 in the most efficient manner, thereby permitting an increase of speed which results in the desired reduction in the cost of the turbo-generators.

The terms upper and lower are employed in this specification merely to designate direction with reference to the particular form of turbine disclosed, but it is not desired to limit the invention to such specific construction or design. It should be understood that it is not desired to be limited to the exact details of construction shown and described, for obvious modifications will occur to a person skilled in the art.

It is claimed and desired to secure by Letters Patent,—

1. As an article of manufacture, a turbine guide vane adjustable about an axis parallel to the turbine axis to vary the distance between the vane and the turbine, said vane having a trailing edge which is inclined relative to the turbine axis.

2. As an article of manufacture, a turbine guide vane having a warped guiding surface which approaches the turbine axis in the direction receding from the turbine discharge.

3. As an article of manufacture, a turbine guide vane adjustable about an axis parallel to the turbine axis to vary the distance between the vane and the turbine, said vane having a trailing edge which is inclined relative to the turbine axis and the angle of relative inclination of said edge and axis being acute opening toward the turbine discharge.

4. As an article of manufacture, an adjustable turbine guide vane having a warped guiding surface which approaches the turbine axis in the direction receding from the turbine discharge.

5. As an article of manufacture, a turbine guide vane having adjacent its trailing edge a warped guiding surface which approaches the turbine axis in the direction receding from the turbine discharge.

6. As an article of manufacture, a turbine guide vane having an axis parallel to the turbine axis and having a trailing edge which is inclined relative to the turbine axis, said guide vane having warped guiding surfaces which approach the turbine axis in the direction receding from the turbine discharge.

7. As an article of manufacture, a turbine guide vane adjustable about an axis parallel to the turbine axis to vary the distance between the vane and the turbine, said vane having a trailing edge inclined relative to the turbine axis and lying in a plane substantially parallel to said vane axis.

8. As an article of manufacture, a turbine guide vane having a warped guiding surface which approaches the turbine axis in the direction receding from the turbine discharge, and having a closing contact surface lying in a plane substantially parallel to the axis of said vane.

9. As an article of manufacture, an adjustable turbine guide vane having its portions receding from the turbine discharge distorted inwardly toward the turbine axis and also in a direction along the adjacent fluid passage.

10. As an article of manufacture, a turbine guide vane adjustable about an axis to vary the distance between the vane and the turbine, said vane having its trailing edge inclined relative to the turbine axis and relative to the direction of flow of the turbine motive fluid.

11. As an article of manufacture, a turbine guide vane having intersecting warped guiding surfaces which approach the turbine axis in the direction receding from the turbine discharge.

12. As an article of manufacture, a turbine guide vane adjustable about an axis parallel to the turbine axis to vary the distance between the vane and the turbine, said vane having intersecting warped guiding surfaces which approach the turbine axis in the direction receding from the turbine discharge.

13. In a hydraulic turbine, the combination of a casing inlet passage having walls perpendicular to the turbine axis, runner blades having their leading edges circularly arranged, and guide vanes having their trailing edges circularly arranged, the leading runner edges at one end being nearer the axis than at their other end and the corresponding ends of the trailing guide vane edges being similarly arranged.

14. In combination, a turbine runner, a casing having walls perpendicular to the axis of said runner, and a guide vane having a trailing edge inclined relative to said walls, said guide vane having surfaces forming substantially the same inlet angle with the adjacent tangents at all portions of the periphery of said runner.

15. In combination, a turbine runner, a casing having walls perpendicular to the axis of said runner, and a guide vane having a trailing edge inclined relative to said walls, said guide vane being adjustable to vary the distance between said edge and said runner.

16. As an article of manufacture, an adjustable turbine guide vane having its portions receding from the turbine discharge skewed in a direction toward the turbine and along the adjacent fluid passage.

In testimony whereof, the signature of the inventor is affixed hereto in the presence of two witnesses.

ARNOLD PFAU.

Witnesses:
W. H. LIEBER,
ELLA BRICKELL.